US006862924B2

(12) United States Patent
Xi et al.

(10) Patent No.: US 6,862,924 B2
(45) Date of Patent: Mar. 8, 2005

(54) AUGMENTING REALITY SYSTEM FOR REAL-TIME NANOMANIPULATION USING ATOMIC FORCE MICROSCOPY

(75) Inventors: Ning Xi, Okemos, MI (US); Wai Keung Fung, Hong Kong (CN); Mengmeng Yu, Philadelphia, PA (US); Guangyong Li, East Lansing, MI (US)

(73) Assignee: Board of Trustees operating Michigan State University, East Lansing, MI (US)

( * ) Notice: Subject to any disclaimer, the term of this patent is extended or adjusted under 35 U.S.C. 154(b) by 0 days.

(21) Appl. No.: 10/428,578

(22) Filed: May 2, 2003

(65) Prior Publication Data

US 2004/0216517 A1 Nov. 4, 2004

(51) Int. Cl.[7] ............................. G01B 5/28; G01B 7/34
(52) U.S. Cl. ......................................... 73/105; 250/307
(58) Field of Search .................... 73/1.89, 105; 702/85; 250/306, 307

(56) References Cited

U.S. PATENT DOCUMENTS

| | | | | |
|---|---|---|---|---|
| 5,321,977 A | * | 6/1994 | Clabes et al. .................. | 73/105 |
| 5,959,200 A | * | 9/1999 | Chui et al. ..................... | 73/105 |
| 6,100,523 A | * | 8/2000 | Gupta et al. ................... | 250/306 |
| 6,578,410 B1 | * | 6/2003 | Israelachvili .................. | 73/105 |
| 6,666,075 B2 | * | 12/2003 | Mancevski et al. ........... | 73/105 |

OTHER PUBLICATIONS

Hansen et al. "A technique for positioning nanoparticles using an atomic force microscope", Nanotechnology, vol. 9, No. 4, Dec. 1998, pp. 337–342.*
Kageshima et al. "Lateral forces during manipulation of a single C60 molecule on the Si(001)–2x1 surface", Surf. Sci. vol. 517, 2002, pp. L557–L562.*
Sagvolden et al. "Manipulation force microscopy", Rev. Sci. Instrum. vol. 70, No. 6, Jun. 1999, pp. 2769–2775.*
Ludwig et al. "AFM, a tool for single–molecule experiments", Appl. Phys. A, vol. 68, 1999, pp. 173–176.*
Sitti et al. "Tele–Nanoroboticw Using Atomic Force Microscope", Proc. 1998 IEEE/RSJ Intl. Conf. Intelligenet Robots and Systems, Oct. 1998, pp. 1739–1746.*
Sitti, M and Hashimoto, H. "Tele–nanorobotics using an atomic force microscope as a nanorobot and sensor" Advanced Robotics vol. 13, No. 4 pp417–436.*

* cited by examiner

*Primary Examiner*—Michael Cygan
(74) *Attorney, Agent, or Firm*—Harness, Dickey & Pierce, P.L.C.

(57) ABSTRACT

An improved method is provided for performing nanomanipulations using an atomic force microscope. The method includes: performing a nanomanipulation operation on a sample surface using an atomic force microscope; determining force data for forces that are being applied to the tip of the cantilever during the nanomanipulation operation, where the force data is derived along at least two perpendicularly arranged axis; and updating a model which represents the topography of the sample surface using the force data.

23 Claims, 8 Drawing Sheets

AUGMENTING REALITY SYSTEM FOR REAL-TIME NANOMANIPULATION USING ATOMIC FORCE MICROSCOPY

FIELD OF THE INVENTION

The present invention relates generally to nanomanipulation using atomic force microscopy and, more particularly, an improved technique for providing real-time sensor feedback during a nanomanipulation operation.

BACKGROUND OF THE INVENTION

Since the inception of atomic force microscopy (AFM), it has become the standard technique in imaging various sample surfaces down to the nanometer scale in ambient or fluid medium. Compared with scanning tunneling microscopes (STM), AFM is commonly employed for imaging nano sized objects or structures since it is applicable to all materials while STM can only be used for conducting or semi-conducting materials. Besides its capability to characterize surfaces in nanometer scale, it has been demonstrated recently that AFM can be employed to modify surfaces and manipulate nano sized structures. For instance, by using AFM, thin oxide structures have been rearranged on the underlying surface by increasing applied load while scanning. The sled-type motion of C60 islands during imaging has been studied by Y Kim and C. M. Lieber as reported in "Machining Oxide Thin Films with an Atomic Force Microscope: Pattern and Objective Formation on the Nanometer Scale", Science Vol. 257:375–377, 1992. In "Sled-type Motion on the Nanometer Scale: Determination of Dissipation and Cohesive Energies of C60"by R. Luthi, E. Meyer, H. Haefke, L. Howald, W. Gutmannsbauer and H. J. Guntherodt, Science, Vol. 266:19779–1981, 1994, it was demonstrated that AFM can be used to deliberately move an Au cluster on a smooth surface. The applications of AFM to manipulate and position nanometer-sized particles with nanometer precision was discussed by T. Junno, K. Deppert, L. Montelius and L. Samuelson in "Controlled Manipulation of Nanoparticles with an Atomic Force Microscope", Applied Physics Letters, Vol. 55:3627–3629, June 1995. Using AFM to construct arbitrary patterns of gold nanoparticles was reported by A. A. G. Requicha, C. Baur, A. Bugacov, B. C. Gazen, B. Koel, A. Madhukar, T. R. Ramachandran, R. Resch, and P. Will in "Nanorobotic Assembly of Two-dimensional Structures" Proc. IEEE Int. Conf. Robotics and Automation, 3368–3374, May 1998. In these experiments, the samples were first imaged in non-contact mode to minimize the lateral force acting on the samples and then manipulation was carried out with the normal force feedback switched off. A problem with this process is that the normal force cannot be controlled during manipulation, as the force feedback is switched off. This might result in either breaking cantilevers due to large normal force or insufficient force to keep the tip in contact with the surface. Another problem of this manipulation scheme is that it can only manipulate two-dimensional nanostructures on a smooth substrate surface. The surface tilt must be carefully removed before manipulation. One possible solution for this problem is to use techniques developed for three-dimensional nanomanipulation.

A promising method for 3-D nanomanipulation is to build a small nanomanipulator inside the vacuum capsule of a scanning electron microscope (SEM). Piezoelectric manipulators constructed inside the SEM have the ability to manipulate objects along the three linear degrees of freedom using the AFM tip as the end-effectors. Several kinds of manipulation of carbon nanotubes were performed using this device. The obvious advantage of this method is that multi-end effectors can be built inside the SEM to achieve more degrees of freedom. The manipulation can be performed between the end-effectors without the need of a substrate. The operation can also be monitored in real time. However, the manipulation accuracy of this method is not comparable to using the AFM. Since the samples are placed in vacuum and exposed to electron beam with high energy, this manipulator cannot be used to manipulate biological samples. The expense of a SEM, ultrahigh vacuum condition, and space limitation inside the SEM vacuum capsule also impede the wide application of this method.

Another scheme was proposed by L. T. Hansen, A. Kuhle, A. H. Sorensen, J. Bohr and P. E. Lindelof in "A Technique for Positioning Nanoparticles using an Atomic Force Microscope", Nanotechnology, Vol. 9:337–342, 1998. In this scheme, the nanoparticles were imaged in tapping mode and pushed over a surface in contact mode, while the normal feedback was switched on. This method can be considered as the beginning of the 3-D nanomanipulation in the sense that the cantilever tip follows the topography of the surface using the internal feedback control. However, this method takes the risk of hazardous action of the feedback mechanism when switching on and off the vibration of the cantilever, changing the gains of the feedback loop, changing other parameters such as setpoint, tip velocity, while the tip is touching the sample surface.

Recently, some researchers are trying to combine AFM with virtual reality interface and haptic devices to facilitate the nanomanipulation. By introducing a virtual environment of the samples, nanomanipulation using the AFM becomes much easier. Besides three-dimension synthetic visual feedback to users, a one degree of freedom haptic device has been constructed for haptic sensing by M. Sitti and H. Kashimoto in "Tele-nanorobotics using Atomic Force Microscope", Proc. IEEE Int. Conference Robotics and Automation 1739–46 October 1998. In the manipulation mode, during approaching to and contacting the surface of the object, or manipulating the object, the operator controls the x-y-z motion of the cantilever while feeling the normal tip-sample interaction force. However, because only the normal force is "feelable" during manipulations, this method may take the risk of breaking cantilever and damaging the tip when large lateral forces occur. These methods can also be considered as the 3-D nanomanipulation since the cantilever tip can be controlled either by the internal force feedback control loop or by the operator through the haptic device to follow the topography of the surface.

Therefore, it is desirable to an improved method for performing nanomanipulation operations using an atomic force microscope. By carefully modeling the sample surface within the AFM frame, the arbitrary and feasible motion paths of the tip are obtainable through three-dimensional path planning. Furthermore, it is desirable to detected the forces acting upon the tip during a nanomanipulation operation. The forces may then be used to provide real-time feedback to an operator of the atomic force microscope. This allows the operator adjust the paths in real-time to ensure sufficient force without damaging the tip of the objects under manipulation.

SUMMARY OF THE INVENTION

In accordance With the present invention, a method is provided for performing nanomanipulations using an atomic force microscope. The method includes: performing a nanomanipulation operation on a sample surface using an atomic force microscope; determining force data for forces that are being applied to the tip of the cantilever during the nanomanipulation operation, where the force data is derived along at least two perpendicularly arranged axes; and updating a model which represents the topography of the sample surface using the force data. In one aspect of the present invention, visual feedback is provided to an operator of the atomic force microscope using the updated model. In another aspect of the present invention, the force data is feed to a haptic joystick being used by the operator of the atomic force microscope.

For a more complete understanding of the invention, its objects and advantages, reference may be had to the following specification and to the accompanying drawings.

DESCRIPTION OF THE PREFERRED EMBODIMENT

Figure 1:
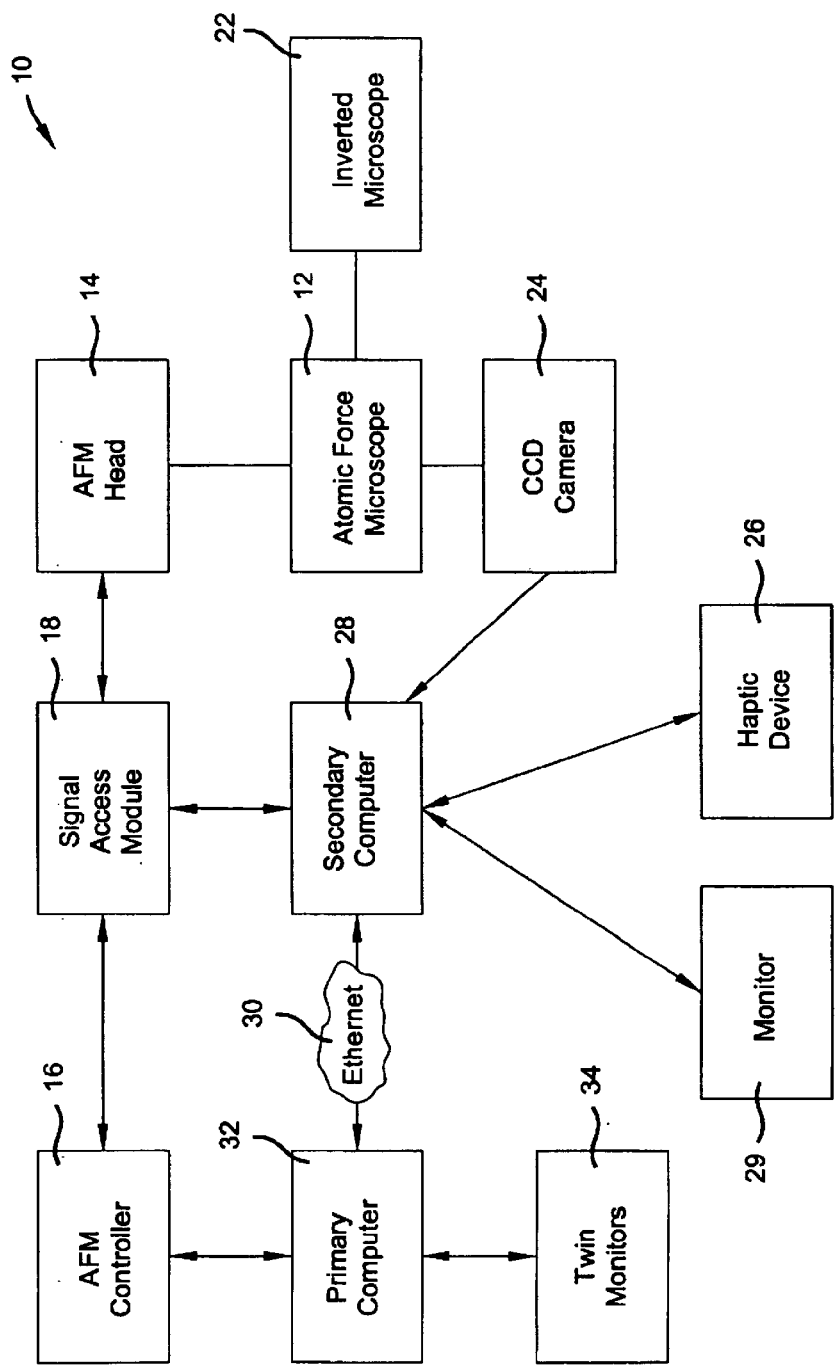
FIG. 1 is a block diagram of an exemplary nanomanipulation system in accordance with the present invention.

An exemplary nanomanipulation system is depicted in FIG. 1. The nanomanipulation system 10 is generally comprised of an atomic force microscope 12, an associated closed-loop head 14 and a microscope controller 16. While the following description is provided with reference to a particular system configuration, it is readily understood that other system configurations are also within the scope of the present invention.

Atomic force microscopes (AFM) operate by measuring a local property, such as height, optical absorption, or magnetism, with a probe or "tip" placed very close to the sample. The relatively short distance separating this tip and the sample allow the AFM 12 to take measurements over a small area. The AFM 12 measures the forces at the atomic level between the sharp probing tip, which is attached to a cantilever spring, and the sample surface. Images are taken by scanning the sample relative to the probing tip and measuring the deflection of the cantilever as a function of lateral position. To acquire an image, the AFM 12 scans back and forth with the probe over the sample while measuring the local property in question. As the probe moves, an image device displays information, row by row, eventually forming a single image. An exemplary atomic force microscope is further described in U.S. Pat. No. 5,567,872 which is incorporated by reference herein. Although an atomic force microscope is presently preferred, this is not intended as a limitation on the broader aspects of the present invention. On the contrary, other types of scanned-proximity probe microscopes (e.g., scanning tunneling microscopes) are also within the scope of the present invention.

In operation, the AFM closed-loop head 14 is controlled by the AFM controller 16. Between AFM closed-loop head 14 and AFM controller 16 there is a signal access module 18 which can be used to connect to other devices to form external control loops. The AFM controller 16 is also connected to a primary computing device 32 which is responsible for running the main program of the system. The primary computing device 32 also provides an interface for an operator to change control parameters and view real-time data with a set of twin monitors 34.

During a nanomanipulation operation, displacement of the tip is captured by a position detector associated with the AFM 12. Through the signal access module 18, the displacement signal from the AFM 12 can go directly into an A/D converter card residing in a secondary computing device 28. The usage of an additional A/D card provides a faster sample rate which is needed for force feedback control. The two computing devices communicate with each other through an Ethernet connection 30.

The system 10 may also includes various peripheral devices, such as an inverted optical microscope 22, a CCD camera 24, and a haptic device 26. The inverted optical microscope 22 and the CCD camera 24 help the operator to locate the tip of the cantilever and adjust the laser, as well as to search for the interesting area on the sample by adjusting the stage which holds the sample if the sample is transparent. The secondary computing device is also connected to a haptic device 26, such as the Phantom™ haptic device commercially available from SensAble Technologies. The haptic device 26 allows the operator to control the motion of the tip of the cantilever. As will be further described below, force data for forces being applied to the tip of the cantilever are feedback in real-time to the haptic device 26 such that the operator can feel the forces.

It is important to carefully calibrate the relative positions among cantilever tip, objectives and the sample surface before performing the 3-D nanomanipulations. However, the precise position measurements of nanometer scale structures are hindered by the intrinsic nonlinearity, hysteresis, creep, thermal drift of the piezotube scanner of the AFM. It is also difficult to position the cantilever tip to an exact position during manipulations. A lot of techniques have been developed to compensate the nonlinearities of the piezotube scanner. For instance, an open loop compensation method may be used to derive the voltages applied to the x and y quadrants of the piezotube during the scan based on a model of the piezotube. In another instance, a simple two-axis optical beam displacement sensor for accurate measurement of the (x,y) position of the piezotube scanner was introduced. A feedback control loop was formed to improve the scanning accuracy. However, this method limits the achievable scan speed and also adds noise from the sensor and the control system to the scanning data. Recently, substantial improvements in positioning precision and operating speed has been achieved by employing the inverse model of the piezotube inside the closed-loop control. In the present invention, feedback correcting using optical sensors in X-Y direction is employed when imaging and operating on the surface. Comparing with the achievements of precise position, the noise from the sensor is tolerable.

Figures 2A, 2B:
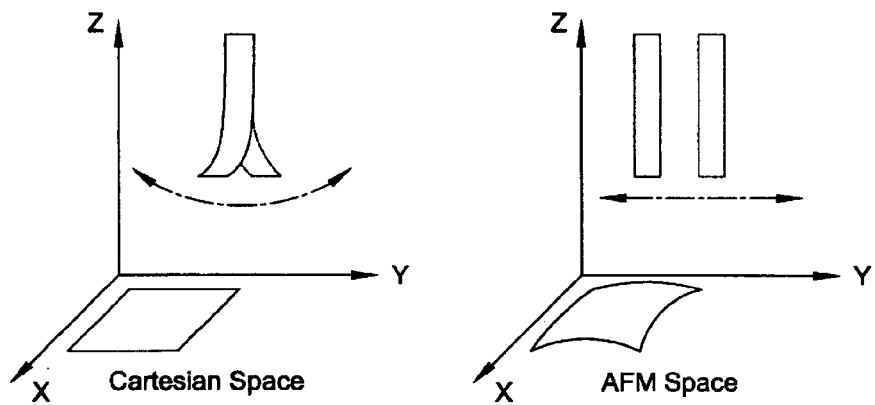
FIGS. 2A and 2B are diagrams illustrating the scanning trajectory of a piezotube as viewed in a Cartesian space and an AFM space, respectively.

In order to define the precise position of the features or objects on the surface, a coordinate frame must be assigned to the sample surface. It should be noted that, due to the scanning mechanism of the piezotube, the scanning data that represent the surface topography are usually not consistent with the normal Cartesian coordinate system. Topography represented in AFM frame is always convoluted with a convex bow. A flat surface in a Cartesian frame will become a convex bow in an AFM frame as shown in FIGS. 2A and 2B. The magnitude of the curvature depends on the scanning size. The bow is ignorable for a small scanning size within several microns but becomes significant for larger scanning sizes. In the exemplary system 10, the uncorrected bow is about 60 nm for scanning size of 90 $\mu$m×90 $\mu$m. By offline image processing techniques, the bow are usually partially removed by flattening the surface. However, the present invention makes use of the bow effect to construct the AFM frame. Manipulation may be carried out under the same AFM frame because we use the same piezotube both as scanning sensor and manipulation actuator. This means that we do not need to map the data from AFM frame to Cartesian frame for calibration and path planning and then map the generated paths back to AFM frame for manipulation. For conveniences, the center of the AFM frame is usually assigned to the center point on the surface which is first touched by the tip after tip engagement to the surface. The fast scan axis is defined as the X-axis and Y-axis is defined to be along the slow scanning direction. The Z direction is normal to the X-Y plane.

Figure 3:
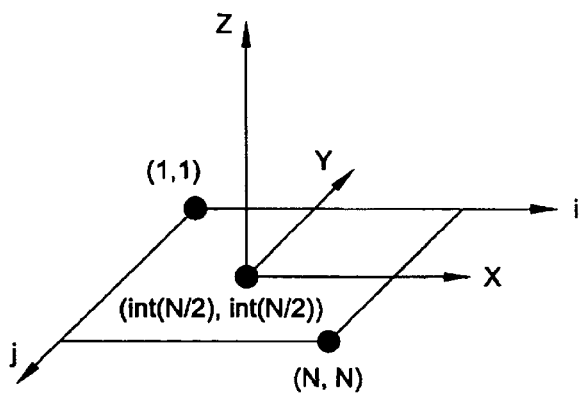
FIG. 3 is diagram that shows the relationship between a three-dimensional representation and a matrix representation of the topography of the sample surface.

Modeling sample surface in AFM frame is simpler than the usual post-scanning image processing steps although it uses the same techniques to modify the scanning data such as removing noise. The usual post-scanning image processing steps attempts to generate a better view of the features on the surface by modifying the image such as flattening and de-nosing the image, while the main purpose of the modeling is to capture the precise position of the features. The topography data must be left unchanged for the modeling. By turning off all the software image correcting function of the AFM, which could modify the raw data, such as "line", "flat" and "offset", the topography of the surface is rendered by a matrix, M, with dimension of N×N, where N depends on the sampling rate and usually equals to 128, 256, 512, or even 1024 for fine imaging. It should be pointed that the bigger N is, the longer it takes to complete a single image scan. The relation between the 3-D representation and the matrix representation, which are shown in FIG. 3, and are described by the following equations $$x = (i - int(N/2))L/(N-1)$$
$$y = -(j - int(N/2))L/(N-1)$$
$$z = M(i,j) - M(int(N/2), int(N/2))$$

where L is the scanning size, and int( ) is a rounding function.

Conventional Nan manipulation using AFM are usually performed in a two-dimensional surface. The tip motion in Z direction is blocked by turning off the normal force feedback, thus the z value remains constant during manipulation. This approach needs a very flat sample surface and the tilt of the surface must be carefully removed. By keeping the normal feedback on during manipulation, or using the haptic devices with the aid of virtual reality, the movement of the cantilever tip can be constrained to follow the surface topography in three dimensions. These methods have been proven very useful and successful in pushing and cutting objects on the sample surface. Since the tip needs to be pressed into the surface during pushing as the dash line shown in FIG. 4, it is usually worn out quickly and contaminated easily. Because the same tip is used for manipulating and imaging, the lateral resolution of the imaging may decrease after each operation.

Figure 4:
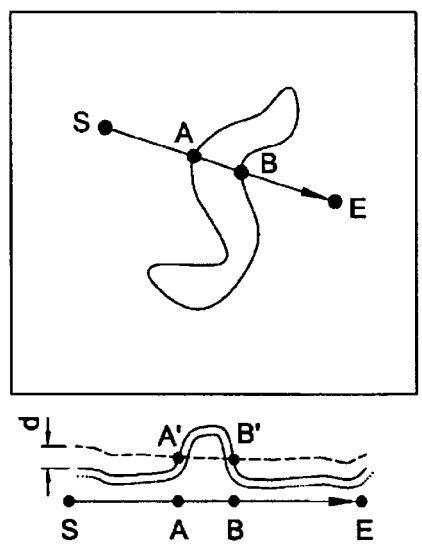
FIG. 4 is a diagram illustrating different motion paths for a cantilever tip of an atomic force microscope in relation to a sample surface.

When the adhesive forces between the objects and the surface are large enough, the objects become unpushable because the tip tries to follow the topography as the dash line shows in FIG. 4. On the other hand, if the tip follows the dash-dot line in FIG. 4, it can either push the objects to the goal or cut the object, depending on the magnitude of the adhesive forces between objects and the surface. In the following subsection, we discuss how to find the ideal paths for different cases.

Figure 5A:
FIGS. 5A–5C are diagrams illustrating a possible inscription pattern and associated two-dimensional nanolithography paths.
Figure 5B:
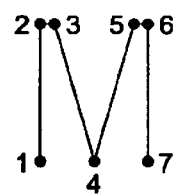

The projection of the path for nanolithography to the X-Y plane is the designed pattern. The motion trajectory is approximated by a sequence of m line segments. The total (m+1) points are composed of the joints of the segments plus the starting and ending points of the motion trajectory in X-Y plane. For example, if a letter "M" shown in FIG. 5A is a pattern which needs to be inscribed on a surface, the two dimensional path follows the sequence of linear segments from Point 1 to Point 7 or inversely as shown in FIG. 5B.

There are two different ways to implement the planning path in three dimensions. In a first method, keep the normal force feedback on but set a large constant force for the tip to push into the surface. When the tip is moving in X,Y direction, it will automatically follow the topography of the surface while maintaining the constant pressure to the surface with the force feedback. This method is simple and successful for nanoinscribing, but is not realizable for other cases which need non-contact with the surface. In a second method, turn off the normal force feedback but generate a three-dimensional path based on the surface modeling data. Since the x, y coordinates of the points defined the path are already finely designed, we only need to obtain the z coordinates of the path to perform the three-dimensional motion. The z coordinates can be found as $$z=M(i,j)-M(int(N/2),int(N/2))+d$$

where d is the depth, which is either positive or negative, such that d>0 means that the tip moves above the surface and d<0 means that the tip presses into the surface during moving. The index i, j are determined by $$i=int((N-1)x/L)+int(N/2)$$
$$j=int(N/2)-int((N-1)y/L)$$

Figure 5C:
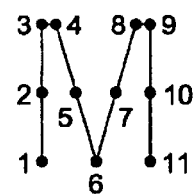

According to R. W. Stark, S. Thalhammer, J. Wienberg and W. M. Heckl in "The AFM as a tool for Chromosomal Dissection-the Influence of Physical Parameters", Applied Physics A, Vol. 66:579–584, 1998, z-modulation can decrease the lateral force and avoid uncontrollable tip movement across the sample. Sometimes, in order obtain a finer nanolithography result on a bumpy surface, the longer segments may need to break into several shorter segments as shown in FIG. 5C.

Comparing with nanolithography, pushing and cutting are more difficult to implement at nanometer scale since friction at the nanometer scale differs significantly from that of the macro scale. Experimental results show that friction at the nanometer scale is an intrinsic property of the particular interface. An object undergoing lateral motion while in contact with a second object can either roll or slide. There is not much difference between pushing and cutting for path planning problem, because whether the objects can be pushed or cut depends on the property of the interface between the objects and the substrate surface. If the friction is small, the objects can be pushed away to the goal either by sliding or rolling; if the friction is large enough, the objects may be dissected or unaltered. The paths are similarly designed both for pushing and cutting. How to design a scheme which can distinguish between pushing and cutting without changing the interface property is still an open problem.

The two different ways used in nanolithography can implement pushing/cutting paths in three dimensions. As shown in FIG. 4, if the tip is driven from point S directly to point E, the force feedback loop will guarantee the tip contacting the surface when first method is used. However, since the first method wears out and contaminates the tip easily, the second method is preferred. In second method, the path is designed based on the three segments SA, AB and BE. The same path planning techniques as in nanolithography are used for SA and BE, while a straight line A' B' in 3-D as shown in FIG. 4 is designed for segment AB. Sometimes, a negative depth d may be used to improve the performance without wearing out and contaminating the tip so quickly.

In sum, motion paths are generated by carefully modeling the sample surface with the AFM reference frame and then path planning in relation to the AFM reference frame. By following the generated motion paths, the tip can either follow the topography of the surface or move across the surface in a way that avoids collisions.

Figure 6:
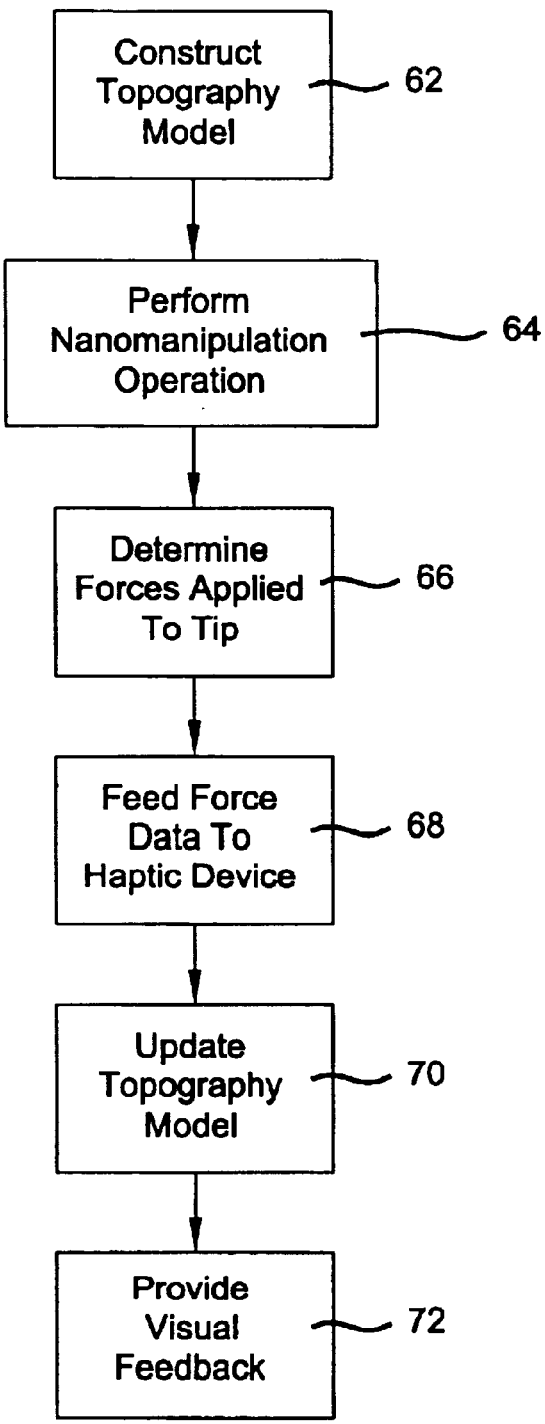
FIG. 6 is a flowchart depicting a method for performing nanomanipulation operations in accordance with the present invention.

In another aspect of the present invention, nanomanipulation operations are performed with real-time sensor feedback being provided to an operator of the nanomanipulation system. Referring to FIG. 6, an improved method is provided for performing nanomanipulation on a sample surface using an atomic force microscope. Before nanomanipulation, the operator constructs a model which represents the topography of the sample surface. To construct the model the operator scans the sample surface using the atomic force microscope.

Next, the operator performs a nanomanipulation operation in relation to the sample surface as shown at step 64. For instance, the operator may control the tip of the cantilever to manipulate a target object associated with the sample surface. During the operation, the system detects the forces that are being applied to the tip of the cantilever at step 66. Specifically, the system captures displacement data for the tip of the cantilever during the nanomanipulation operation. Using the displacement data, force data for the forces that are being applied to the tip of the cantilever are determined by the system, such that force data is derived along at least two perpendicularly arranged axis. An exemplary technique for determining the force data is further described below.

The force data may then be used to provide real-time feedback to the operator of the system. For instance, the force data may be feed at step 68 to a haptic device associated with the atomic force microscope. In another instance, visual feedback may be provided at step 72 to the operator of the system. In this instance, the force data is used to update in real-time the sample surface model. More specifically, interaction forces between the tip of the cantilever and the target object being manipulated is derived from the force data as is readily understood by one skilled in the art. Positional data for the target object is then determined based on the derived interaction force data. Lastly, the sample surface model is updated and displayed to the operator using the computed positional data for the target object. In this way, real-time meaningful visual feedback is provided to the operator of the system.

The normal and lateral forces acting upon the cantilever tip may be determined by carefully analyzing the tip force and cantilever interaction. Force information is inherent in AFM-based systems since the normal force applied on the tip can be calculated from cantilever deflection according to the spring model of the cantilever $$F_n = k\delta_z$$

where Fn is the normal force, k is spring constant of the cantilever and $\delta_z$ is the deflection. Once the deflection and spring constant are known, the normal force can be calculated immediately.

Figure 7:
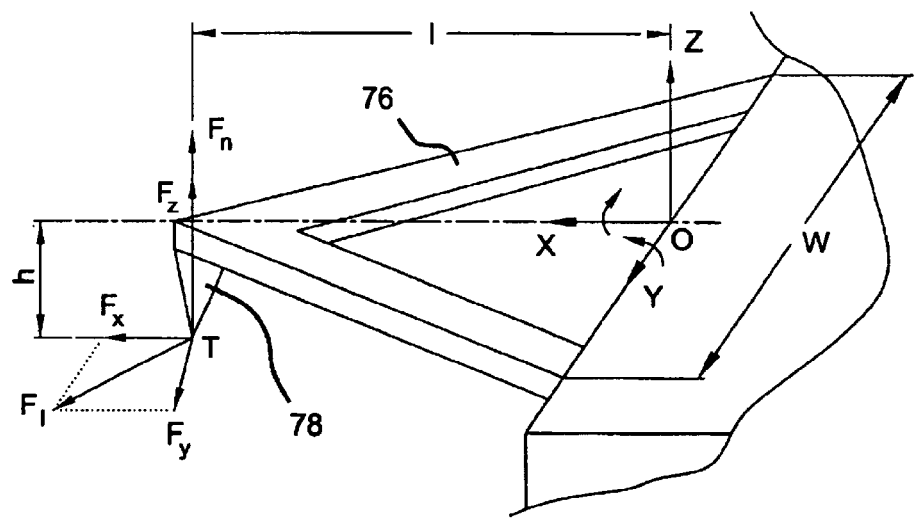
FIG. 7 is an exemplary force analysis model for the cantilever of an atomic force microscope.
Figure 8:
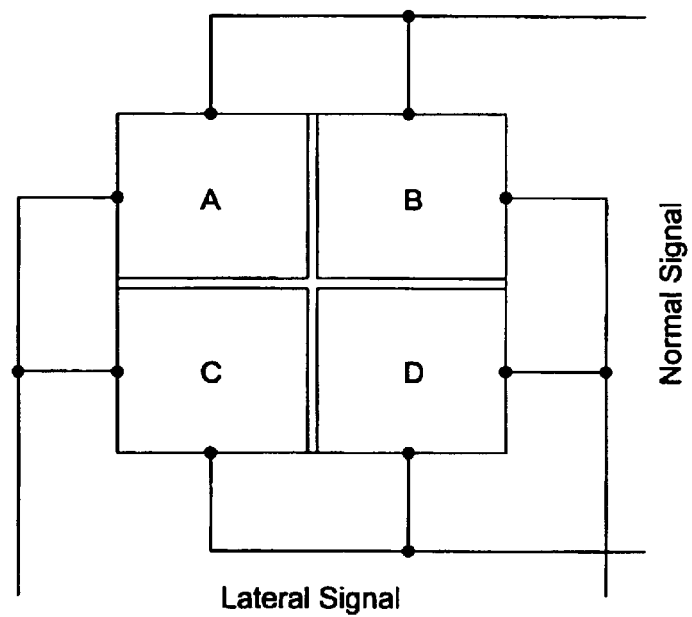
FIG. 8 illustrates the measurement quads of an exemplary photodiode detector.

FIG. 7 is a diagram of a cantilever 76 on an atomic force microscope. The cantilever 76 includes a tip 78 for performing nanomanipulation operations on a sample surface. Suppose three-dimensional forces (Fx,Fy,Fz) are defined in relation to the to the tip apex as shown in FIG. 7. These forces result in three-dimensional torques ($\tau_x,\tau_y,\tau_z$) relative to point O as follows:

$$\tau_x = F_y h$$
$$\tau_y = -F_z l - F_x h$$
$$\tau_z = F_y l$$

where $\tau_x$ causes the cantilever end to twist an angle $\theta_x$ along the X axis, $\tau_y$ causes the cantilever to bend $\delta_z$ in the Z direction, and $\tau_z$ causes the cantilever to bend $\delta_y$ in the Y direction. Although $\delta_y$ is not measurable, $\theta_x$ and $\delta_z$ can be obtainable using a quad-photodiode detector as shown in FIG. 8. $\theta_x$ and $\delta_z$ are derived as follows:

$$\theta_x = K_l S_l$$
$$\delta_z = K_n S_n$$

where Kl and Kn are constants which need to be calibrated, Sn and Sl are the normal signal and lateral signal outputs which are obtained as follows:

$$S_n = \frac{(A+B)-(C+D)}{A+B+C+D} \text{ and } S_l = \frac{(A+C)-(B+D)}{A+B+C+D}.$$

Kn can be easily obtained by finding the slope of the force curve in contact region as is readily known in the art. On the other hand, calibration of Kl is a very difficult task. It is still an open problem to determine this constant exactly by experiments but other techniques exist to calibrate the lateral force by using the known normal force.

Since $\tau_y$ is caused by Fz and Fx, and the effects of Fx cannot be removed from the signal, a pseudo force Fn is defined along z direction as shown in FIG. 6 such that $$F_n = -\frac{\tau_y}{l} = F_z + \frac{h}{l}F_x$$

This pseudo force is the normal force as measured by the equation set forth above. This equation for the pseudo force may explain why the difference between the trace and retrace line is observed different during image scanning when the fast scanning direction is along the X-axis of the cantilever frame. However, it is also clear that $Fn \approx Fz$ because h/l is usually very small.

The relationship between the workspace frame and the cantilever frame is determined by following rotational matrix $$R = \begin{bmatrix} -\cos\psi & \sin\psi & 0 \\ -\sin\psi & -\cos\psi & 0 \\ 0 & 0 & 1 \end{bmatrix}$$

where $\psi$ is the fast scanning angle during imaging. If the tip motion direction in the AFM frame is known as $\vec{V}_{AFM}$, its motion direction in the cantilever frame can be found as $$\vec{V}_C = R\vec{V}_{AFM}$$

Suppose the tip lateral motion direction has an $\phi$ angle with respect to the X-axis of the cantilever frame, the lateral force F1 must be opposite to the motion direction, and its amplitude can be found by $$F_f = F_y/\sin\phi$$

where Fy is measured by $$F_y = \frac{k_1}{h}\theta_x,$$

and where kl is the torsional constant of the cantilever. The lateral force in the X direction can be calculated as $$F_x = F_y \tan\phi$$

Thus, the three-dimensional forces represented in AFM frame are $$[F_{px}, F_{py}, F_{pz}]^T = R^{-1}[F_x, F_y, F_z]^T$$

By feeding these three-dimensional forces $[F_{px}, F_{py}, F_{pz}]^T$ to the haptic device, the operator can feel the forces, which are proportional to the actual forces acting on the cantilever.

In order to obtain actual forces acting on the tip, the spring and torsion constants must be calibrated by measuring the deflection signal from the quad-photodiodes array. The spring constant kn is usually provided by manufacturer or can be calibrated experimentally as is well known in the art. On the other hand, it is still an open problem to determine the torsion constant, kl, precisely by experiments. Although kl and Kl cannot be obtained individually, their product, (klKl/h) can be obtained using other known techniques to directly calibrate the relation between the lateral force and the output of the quad-photodiodes. One exemplary calibration method is further described by D. F. Ogletree, R. W. Carpick, and M. Salmeron in "Calibration of Frictional Forces in Atomic Force Microscopy", Review of Scientific Instruments, Vol. 67:3298–3306, 1996; other known techniques are also within the scope of the present invention.

Figure 9A:
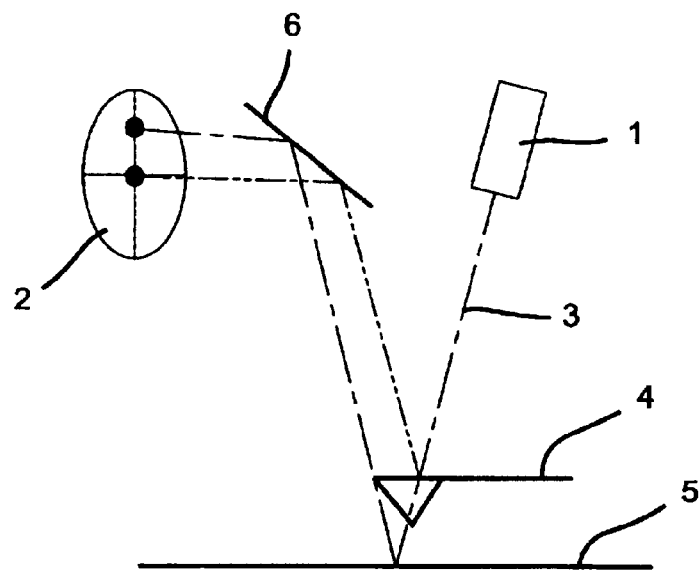
FIGS. 9A and 9B illustrates the detection of false forces by the photodiode detector which are caused by substrate surface reflection and piezotube bow effect, respectively.
Figure 9B:
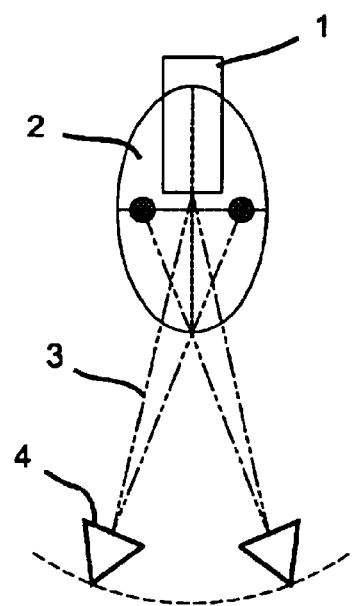

Due to the reflection of the substrate surface, the output of quad-photodiode detector is changing when the tip approaches the substrate surface as shown in FIG. 9A. The reflection of the substrate surface change as well as the original tuning position form a false normal force. Furthermore, the bow effect of the piezo tube also forms a false lateral force signal as shown in FIG. 9B. In order to have authentic force feeling through the joystick, all these false forces must be removed from the signal before feeding them to haptic joystick. In addition, the cross-talk between normal and lateral channels must also be decoupled.

Considering the false forces and the cross-talk between two channels, the forces signal should be compensated with following equations:

$$F_y = \frac{k_l K_l}{h}(S_l - a(i,j) - \alpha(S_n - b(i,j)))$$

$$F_x = -F_y c \tan\phi$$

$$F_z = kK_n(S_n - b(i,j)) - \beta F_x$$

where $\alpha$ and $\beta$ are the cross-talk coefficients between the two channels; a(i,j) and b(i,j) are compensation matrices for lateral and normal channels respectively. The compensation matrices are obtained by scanning the tip above the substrate surface without contact. The compensation matrices can be recovered from the deflection and the friction images.

Another main contribution of the present invention is to update the sample surface modeling in real time based on force feedback information. In order to achieve this goal, the modeling of tip-substrate-object interaction is necessary. A model of tip-object interaction is shown as in FIG. 10. There are three main types of forces: adhesive, repulsive, and frictional force. The labeling of these forces is in such way to easily distinguish them. The three characters in superscript, 'a', 'f', 'r', represent 'adhesive', 'frictional', and 'repulsive', respectively; whereas the three characters in subscript, 't', 'o', 's', represent 'tip', 'object', and 'substrate', respectively. For example, $F_{to}^a$ means that force applied to tip is adhesive force from object. Each these three forces comes from many sources. The adhesive force may come from van der waals force, capillary force, or molecular bonding. The repulsive force mainly comes from the repulsive contact. The frictional force may come from the friction force caused by repulsive contact, and the shear force caused by surface tension. All the forces dominant in the nanoscale are theoretically calculable based on certain model. However, it is not feasible to calculate these forces because some parameters needed in the model are not available. For example, the following parameters: object-surface distance, radii of curvature of the meniscus, the thickness of the liquid layer, used to calculate the capillary force, are almost impossible to obtain. Although, each kind of force may not be obtainable, their overall effects are sometimes measurable. For example, the adhesive force and frictional force between tip and substrate surface can be measured using force calibration mode and lateral force mode of AFM, respectively.

Figure 10A:
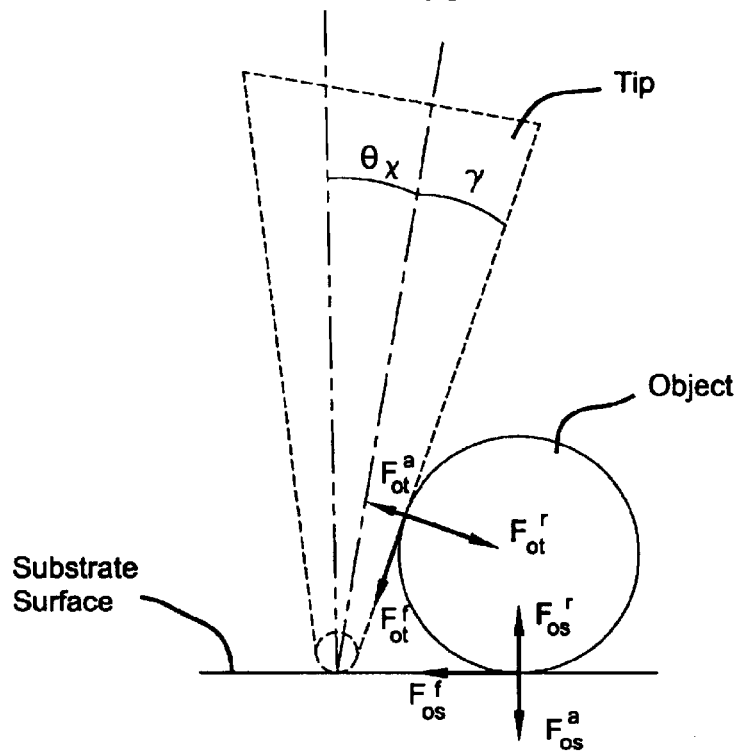
FIGS. 10A and 10B illustrate an exemplary model of tip-substrate-object interaction.
Figure 10B:
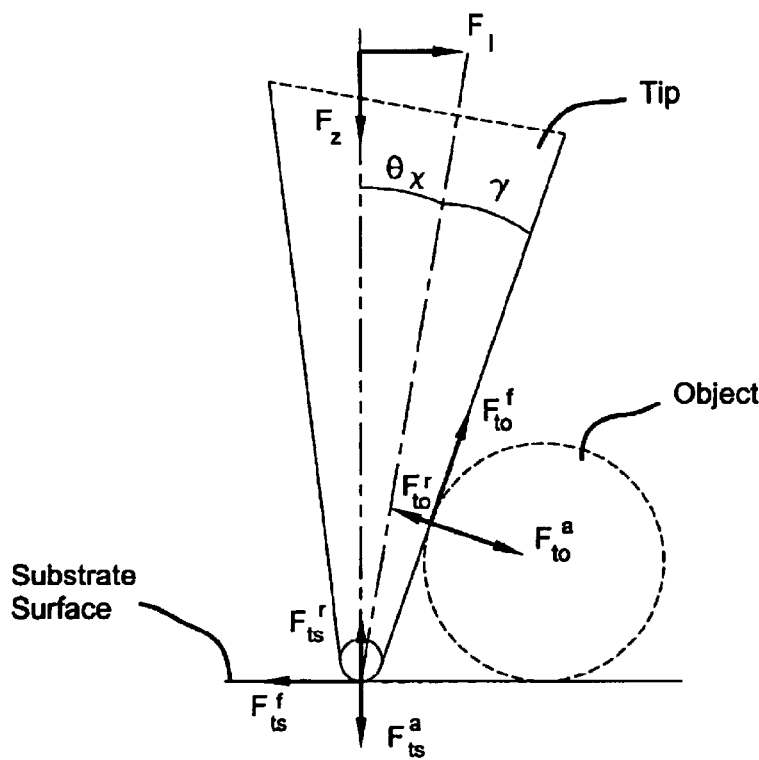

By assuming that the tip is normalized to the object during pushing (the pushing direction is perpendicular to the body axis of the nano-object), the equilibrium condition of the nano-object both in horizontal and vertical direction can be obtained as $$F_{ot}^r \cos\theta = F_{os}^f + F_{ot}^f \sin\theta + F_{ot}^a \cos\theta$$

$$F_{os}^r + F_{ot}^a \sin\theta = F_{ot}^f \cos\theta + F_{ot}^r \sin\theta + F_{os}^a$$

where $\theta = \theta_x + \gamma$, and $\theta_x$ is the twisting angle of the cantilever and $\gamma$ is the open half angle of the tip apex. The forces applied to tip as shown in FIG. 10 should be balanced by the normal force $F_z$ and the lateral force $F_l$ from the cantilever. The equilibrium condition in normal and lateral direction is $$F_z + F_{to}^a \sin\theta + F_{ts}^a = F_{to}^r \sin\theta + F_{to}^f \cos\theta + F_{ts}^r$$

$$F_l + F_{to}^f \sin\theta = F_{to}^r \cos\theta - F_{to}^a \cos\theta + F_{ts}^f$$

Assume $\overline{F}_z$ is the minimum value of $F_z$ to maintain the equilibrium under perfect condition ($F_{ts}^r = 0$, when the tip apex is still contacting the substrate surface). Noting that $F_{ot}^r = F_{to}^r$, $F_{ot}^f = F_{to}^f$, $F_{ot}^a = F_{to}^a$, $\overline{F}_z$ can be solved by setting $F_{ts}^r = 0$ and based on whether the nano-object is sliding or rolling.

In an ideal case, the object should prefer rolling instead of sliding especially for the object with ideal round shape and on flat surface. The rolling behavior of carbon nanotube on graphite substrate surface has been observed by M. R. Falvo, R. M. Taylor, A. Helser, V. Chi, F. P. Brooks, S. Washburn, and R. Superfine in "Nanometer-scale Rolling and Sliding of Carbon Nanotubes", Nature, Vol. 397:236–238, January 1999. During rolling, the object keeps instant static contact with the substrate surface but sliding on the tip surface. The minimum value of Fz in case of rolling is obtained as $$\overline{F}_z = \frac{(\mu_{ot} + v)(\sin\theta + 1)}{\cos\theta - \mu_{ot}\sin\theta - \mu_{ot}} F_{ot}^a - F_{ts}^a$$

where $\mu_{ot}$ is the sliding frictional coefficient between tip and object, which depends on materials' property, and $v$ is the shear coefficient between tip and object, which depends on the geometry shape of the contact. In order to maintain the pushing condition, $F_z$ has to be bigger than $\overline{F}_z$. The additional force is balanced by $F_{ts}^r = F_z - \overline{F}_z$. If $\overline{F}_z < 0$, it means that the adhesive force itself can keep the tip in contact with the substrate surface.

In most cases, the objects under manipulation will slide on the surface due to their irregular shape and the strong adhesive force. During sliding, the object keeps static contact with the tip but slides on the substrate surface. The minimum value of Fz in case of sliding can be obtained as $$\overline{F}_z = \frac{(\mu_{os} + v)\sin\theta}{\cos\theta - \mu_{os}\sin\theta} F_{os}^a - F_{ts}^a$$

where $\mu_{os}$ is the sliding frictional coefficient between object and substrate.

Figure 11:
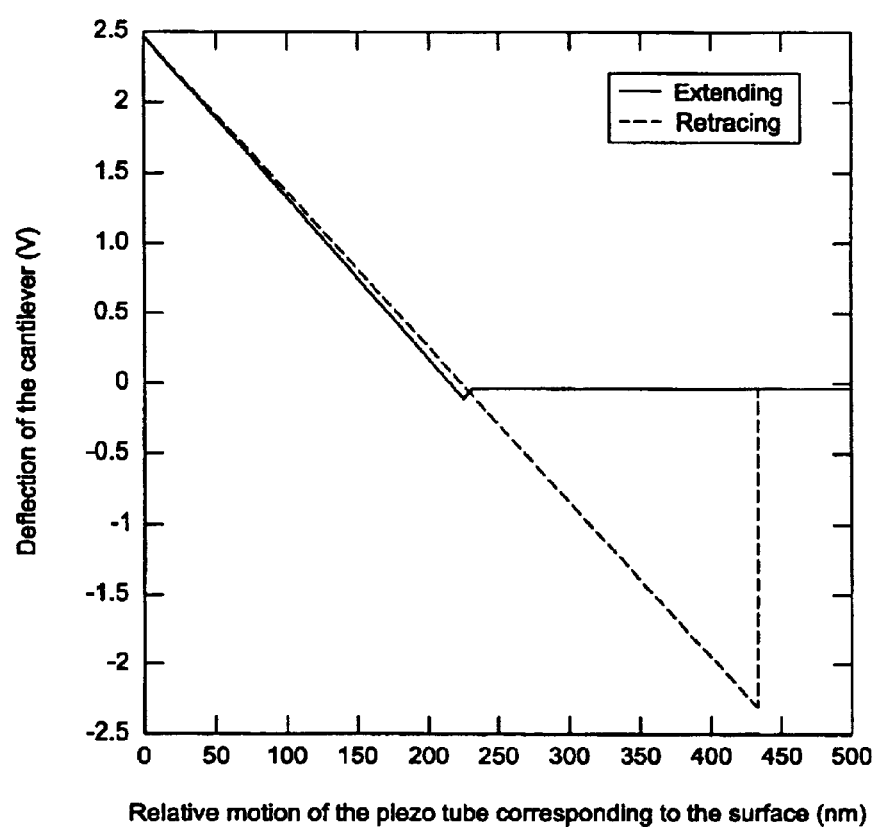
FIG. 11 depicts results from the AFM force calibration mode.

The adhesive force $F_{ts}^a$ is measurable using the force calibration of AFM. FIG. 11 shows the result from AFM force calibration mode. When the tip is approaching the substrate surface, it will suddenly drop down to the surface due to long range of adhesive force. If further pushing the tip down to the surface, the repulsive force causes the deflection of the cantilever. When the tip is driven away from the substrate surface, adhesive force causes the cantilever deflection decreasing until it reach the critical point A to break the equilibrium. $F_{ts}^a$ can be determined by the deflection value at critical point A. Although other adhesive forces are hard to obtain, adhesive force $F_{ts}^a$ can be used to estimate the minimum normal force $\overline{F}_z$. Assume adhesive forces are proportional to the contact areas, then the adhesive forces can be estimated by the objects size such that $$\frac{F_{ot}^a}{F_{ts}^a} = \frac{A_{ot}}{A_{ts}}, \frac{F_{ot}^a}{F_{os}^a} = \frac{A_{ot}}{A_{os}}$$

where $A_{ot}$, $A_{ts}$, $A_{os}$ are the nominal contact area among tip, object and substrate surface respectively.

The minimum value of $\overline{F}_z$ is now computable using known value of $F_{ot}^a$, $F_{os}^a$, $F_{ts}^a$. Comparing the computed $\overline{F}_z$ with the measured $F_z$ in real time, whether the object under pushing is moving or not is determined. If $F_z > \overline{F}_z$, the object stay put, or else it will move along the tip motion direction.

While the invention has been described in its presently preferred form, it will be understood that the invention is capable of modification without departing from the spirit of the invention as set forth in the appended claims.

What is claimed is:

1. A method for performing nanomanipulation on a sample surface using an atomic force microscope, the method comprising:
   providing a image model representing topography of the sample surface;
   performing a nanomanipulation operation on the sample surface using a tip of a cantilever of the atomic force microscope;
   determining force data for forces that are being applied to the tip of the cantilever during the nanomanipulation operation, where the force data is derived along at least two perpendicularly arranged axis;
   updating the image model based on said force data; and
   displaying the updated image model to an operator of the atomic force microscope during the nanomanipulation operation.

2. The method of claim 1 wherein the step of determining force data for forces that are being applied further comprises determining interaction forces between the tip of the cantilever and an object on the sample surface being manipulated by the nanomanipulation operation, and determining positional data for the object based on the interaction forces.

3. The method of claim 2 wherein the image model is updated using positional data for the object.

4. The method of claim 1 wherein the step of determining force data for forces that are being applied further comprises defining a three-dimensional Cartesian coordinate system in relation to the tip of the cantilever, the coordinate system having a first axis axially aligned with the tip of the cantilever, a second axis that aligns with a longitudinal axis of the cantilever and a third axis that is perpendicular to the first and second axes.

5. The method of claim 4 further comprises computing a force that is applied to the tip of the cantilever along the third axis in accordance with $$F_y = \frac{k_l}{h} K_l S_l$$

where $k_l$ is the torsion constant of the cantilever, $K_l$ is a calibrated constant, $S_l$ is a measurable lateral displacement of the tip, and h is the height of the tip.

6. The method of claim 5 further comprises computing a force that is applied to the tip of the cantilever along the second axis in accordance with $$F_x = F_y \tan\theta$$

where $\theta$ is an angle of lateral displacement with respect to the second axis.

7. The method of claim 4 further comprises computing a force that is applied to the tip of the cantilever along the third axis in accordance with $$F_z = kK_n S_n$$

where k is the spring constant of the cantilever, $K_n$ is a calibrated constant, and $S_n$ is a measurable normal displacement of the tip.

8. The method of claim 1 further comprises feeding force data indicative of said forces to a haptic joystick associated with the atomic force microscope.

9. A method for performing nanomanipulation on a sample surface using a scanned-proximity probe microscope, the method comprising:
    performing a nanomanipulation operation on the sample surface using a probe of the scanned-proximity microscope;
    capturing displacement data for a tip of the probe during said nanomanipulation operation;
    determining force data for forces that are being applied to the tip of the probe during the nanomanipulation operation, where the force data is derived along at least one axis defined substantially parallel to the sample surface;
    determining interaction force data for forces between the tip of the probe and an object being manipulated by the nanomanipulation operation;
    determining positional data for the object at least in part based on the interaction force data;
    updating an image model indicative of topography of the sample surface using the positional data; and
    displaying the updated image model to an operator of the scanned-proximity microscope during the nanomanipulation operation.

10. The method of claim 9 wherein the step of determining force data for forces that are being applied further comprises defining a three-dimensional Cartesian coordinate system in relation to the tip of the probe, the coordinate system having a first axis that axially aligns with the tip the probe, a second axis that aligns with a longitudinal axis of the probe and a third axis that is perpendicular to the first and second axes.

11. A method for performing nanomanipulation on a sample surface using an atomic force microscope, the method comprising:
    performing a nanomanipulation operation on the sample surface using a tip of a cantilever of the atomic force microscope;
    capturing displacement data for the tip of the cantilever during said nanomanipulation operation;
    determining force data for forces that are being applied to the tip of the cantilever during the nanomanipulation operation, where the force data is derived in a plane defined substantially parallel to the sample surface;
    determining interaction force data for forces between the tip of the cantilever and an object being manipulated by the nanomanipulation operation;
    determining positional data for the object at least in part based on the interaction force data;
    updating an image model indicative of topography of the sample surface using the positional data; and
    displaying the updated image model to an operator of the atomic force microscope during the nanomanipulation operation.

12. The method of claim 11 wherein the step of determining force data for forces that are being applied further comprises defining a three-dimensional Cartesian coordinate system in relation to the tip of the cantilever, the coordinate system having a first axis that axially aligns with the tip of the cantilever, a second axis that aligns with a longitudinal axis of the cantilever and a third axis that is perpendicular to the first and second axis.

13. A method for performing nanomanipulation on a sample surface using an atomic force microscope, the method comprising:
    performing a nanomanipulation operation on the sample surface using a tip of a cantilever of the atomic force microscope;
    capturing displacement data for the tip of the cantilever during said nanomanipulation operation;
    determining force data for forces that are being applied to the tip of the cantilever during the nanomanipulation operation, where the force data is derived along at least one axis defined substantially parallel to the sample surface;
    determining interaction force data for forces between the tip of the cantilever and an object being manipulated by the nanomanipulation operation;
    determining positional data for the object at least in part based on the interaction force data;
    updating an image model indicative of topography of the sample surface using the positional data; and
    displaying the updated image model in real-time to an operator of the atomic force microscope.

14. The method of claim 13 wherein the step of determining force data for forces that are being applied further comprises defining a three-dimensional Cartesian coordinate system in relation to the tip of the cantilever, the coordinate system having a first axis that axially aligns with the tip of the cantilever, a second axis that aligns with a longitudinal axis of the cantilever and a third axis that is perpendicular to the first and second axis.

15. The method of claim 14 further comprises computing a force that is applied to the tip of the cantilever along the third axis in accordance with $$F_y = \frac{k_1}{h} K_e S_e$$

where $k_l$ is the torsion constant of the cantilever, $K_l$ is a calibrated constant, $S_l$ is a measurable lateral displacement of the tip, and h is the height of the tip.

16. The method of claim 15 further comprises computing a force that is applied to the tip of the cantilever along the second axis in accordance with $$F_x = F_y \tan \theta$$

where is an angle of lateral displacement with respect to the second axis.

17. The method of claim 14 further comprises computing a force that is applied to the tip of the cantilever along the third axis in accordance with $$F_z = KK_n S_n$$

where k is the spring constant of the cantilever, $K_n$ is a calibrated constant, and $S_n$ is a measurable normal displacement of the tip.

18. The method of claim 13 further comprises feeding force data indicative of said forces to a haptic joystick associated with the atomic force microscope.

19. A nanomanipulation system for performing nanomanipulation operations in relation to a sample surface, comprising:
   a scanned-proximity probe microscope having a manipulating member which is operable to perform nanomanipulation operations on the sample surface;
   a data structure for storing image data representing the topography of the sample surface;
   a position detector adapted to ascertain displacement data for the manipulating member during said nanomanipulation operation;
   a controller adapted to receive the displacement data for the manipulating member, the controller operable to determine force data for force that are being applied to the manipulating member in part based on the displacement data and to update image data based on the force data, where the force data is derived along at least two perpendicularly arranged axis; and
   a display in data communication with the controller and the data structure and operable to the updated image data to an operator of the scanned-proximity probe microscope during the nanomanipulation operation.

20. The nanomanipulation system of claim 19 wherein the manipulating member is further defined as a probe having a tip, such that force data is determined in relation to the tip of the probe.

21. A nanomanipulation system for performing nanomanipulation operations in relation to a sample surface, comprising:
   an atomic force microscope having a cantilever with a tip for performing nanomanipulation operations on the sample surface;
   a data structure for storing image data representing the topography of the sample surface;
   a position detector adapted to capture displacement data for the tip of the cantilever during said nanomanipulation operation;
   a controller adapted to receive the displacement data for the tip of the cantilever, the controller operable to determine force data for forces that are being applied to the tip of the cantilever in part based on the displacement data and to update image data based on the force data, where the force data is derived along at least two perpendicularly arranged axis; and
   a display in data communication with the controller and the data structure and operable to the updated image data to an operator of the scanned-proximity probe microscope during the nanomanipulation operation.

22. A method for performing nanomanipulation on a sample surface using an atomic force microscope, the method comprising:
   acquiring scanning data that represents the surface topography of the sample surface using a piezotube of the atomic force microscope;
   expressing the scanning data in a coordinate frame that accounts for nonlinearities associated with the piezotube, thereby constructing a surface model which represents the surface topography of the sample surface;
   performing a nanomanipulation operation on the sample surface using a tip of a cantilever of the atomic force microscope;
   determining force data for forces that are being applied to the tip of the cantilever during the nanomanipulation operation, where the force data is derived along at least two perpendicularly arranged axis; and
   updating the surface model based on said force data.

23. The method of claim 22 where the step of performing a nanomanipulation operation further comprises formulating motion commands for the tip of the cantilever in said coordinate frame.

* * * * *

UNITED STATES PATENT AND TRADEMARK OFFICE
CERTIFICATE OF CORRECTION

| | |
|---|---|
| PATENT NO. | : 6,862,924 B2 |
| APPLICATION NO. | : 10/428578 |
| DATED | : March 8, 2005 |
| INVENTOR(S) | : Ning Xi et al. |

It is certified that error appears in the above-identified patent and that said Letters Patent is hereby corrected as shown below:

Column 1, line 5, before the first paragraph insert --A portion of this invention was made with Government support under Federal Grant Nos. IIS-9796287 and EIA9911077 awarded by the National Science Foundation. The Government may have certain rights in this invention.--

Column 2, line 56, "detected" should be --detect--.

Column 2, line 60, after "operator" insert --to--.

Column 2, line 66, "With" should be --with--.

Column 3, line 11, "feed" should be --fed--.

Column 3, line 25, after "is" insert --a--.

Column 3, line 43, "illustrates" should be --illustrate--.

Column 4, line 35, "includes" should be --include--.

Column 5, line 23, "are" should be --is--.

Column 6, line 64, after "order" insert --to--.

Column 7, line 63, "feed" should be --fed--.

Column 8, line 28, "(Fx,Fy,Fz)" should be --$(F_x,F_y,F_z)$--.

Column 8, line 29, second occurrence, delete second occurrence of "to the".

Column 8, line 51, "Kl and Kn" should be --$K_l$ and $K_n$--.

Column 8, line 52, "Sn and Sl" should be --$S_n$ and $S_l$--.

Column 8, line 58, "Kn" should be --$K_n$--.

UNITED STATES PATENT AND TRADEMARK OFFICE
CERTIFICATE OF CORRECTION

PATENT NO. : 6,862,924 B2
APPLICATION NO. : 10/428578
DATED : March 8, 2005
INVENTOR(S) : Ning Xi et al.

Page 2 of 3

It is certified that error appears in the above-identified patent and that said Letters Patent is hereby corrected as shown below:

Column 8, line 60, "Kl" should be --$K_l$--.

Column 8, line 65, "Fz an Fx" should be --$F_z$ and $F_x$--.

Column 8, line 65, second occurrence, after "of", "Fx" should be --$F_x$--.

Column 8, line 66, "Fn" should be --$F_n$--.

Column 9, line 10, "Fn ≈Fz" should be --$F_n \approx F_z$--.

Column 9, line 39, "kl" should be --$k_l$--.

Column 9, line 56, "kl" should be --$k_l$--.

Column 9, line 57, "kl and Kl" should be --$k_l$ and $K_l$--.

Column 9, line 58, "(klKl/h)" should be --$(k_l K_l/h)$--.

Column 10, line 38, after "each" insert --of--.

Column 11, line 25, "Fz" should be --$F_z$--.

Column 11, line 44, "Fz" should be --$F_z$--.

Column 11, line 61, "reach" should be --reached--.

Column 12, line 21, Claim 1, "a" should be --an--.

Column 13, line 41, Claim 10, after "tip" insert --of--.

Column 14, line 8, Claim 12, "axis" should be --axes--.

Column 14, line 39, Claim 14, "axis" should be --axes--.

Column 14, line 54, Claim 16, "Fz" should be --$F_z$--.

UNITED STATES PATENT AND TRADEMARK OFFICE
CERTIFICATE OF CORRECTION

PATENT NO.        : 6,862,924 B2
APPLICATION NO.   : 10/428578
DATED             : March 8, 2005
INVENTOR(S)       : Ning Xi et al.

It is certified that error appears in the above-identified patent and that said Letters Patent is hereby corrected as shown below:

Column 14, line 55, Claim 16, after "where" insert --$\theta$--.

Column 15, line 15, 2$^{nd}$ occurrence, Claim 19, after "for", "force" should be --forces--.

Signed and Sealed this

Thirty-first Day of October, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,862,924 B2 |
| APPLICATION NO. | : 10/428578 |
| DATED | : March 8, 2005 |
| INVENTOR(S) | : Ning Xi et al. |

Page 1 of 2

It is certified that error appears in the above-identified patent and that said Letters Patent is hereby corrected as shown below:

In the Specification

Column 1, line 5, before the first paragraph insert
--This invention was made with government support under EIA9911077 and IIS9796287 awarded by the National Science Foundation. The government has certain rights in the invention.--.

Column 2, line 56, "detected" should be --detect--.

Column 2, line 60, after "operator" insert --to--.

Column 2, line 66, "With" should be --with--.

Column 3, line 11, "feed" should be --fed--.

Column 3, line 25, after "is" insert --a--.

Column 3, line 43, "illustrates" should be --illustrate--.

Column 4, line 35, "includes" should be --include--.

Column 5, line 23, "are" should be --is--.

Column 6, line 64, after "order" insert --to--.

Column 7, line 63, "feed" should be --fed--.

Column 8, line 28, "(Fx,Fy,Fz)" should be --$(F_x, F_y, F_z)$--.

Column 8, line 29, delete second occurrence of "to the".

Column 8, line 51, "Kl and Kn" should be --$K_l$ and $K_n$--.

This certificate supersedes the Certificate of Correction issued October 31, 2006.

Signed and Sealed this
Tenth Day of December, 2013

Margaret A. Focarino
*Commissioner for Patents of the United States Patent and Trademark Office*

Column 8, line 52, "Sn and Sl" should be --$S_n$ and $S_l$--.

Column 8, line 58, "Kn" should be --$K_n$--.

Column 8, line 60, "Kl" should be --$K_l$--.

Column 8, line 65, "Fz an Fx" should be --$F_z$ and $F_x$--.

Column 8, line 65, second occurrence, after "of", "Fx" should be --$F_x$--.

Column 8, line 66, "Fn" should be --$F_n$--.

Column 9, line 10, "Fn ≈Fz" should be --$F_n \approx F_z$--.

Column 9, line 39, "kl" should be --$k_l$--.

Column 9, line 56, "kl" should be --$k_l$--.

Column 9, line 57, "kl and Kl" should be --$k_l$ and $K_l$--.

Column 9, line 58, "(klKl/h)" should be --$(k_l K_l/h)$--.

Column 10, line 38, after "each" insert --of--.

Column 11, line 25, "Fz" should be --$F_z$--.

Column 11, line 44, "Fz" should be --$F_z$--.

Column 11, line 61, "reach" should be --reached--.

In the Claims

Column 12, line 21, Claim 1, "a" should be --an--.

Column 13, line 41, Claim 10, after "tip" insert --of--.

Column 14, line 8, Claim 12, "axis" should be --axes--.

Column 14, line 39, Claim 14, "axis" should be --axes--.

Column 14, line 54, Claim 16, "Fz" should be --$F_z$--.

Column 14, line 55, Claim 16, after "where" insert --$\theta$--.

Column 15, line 15, 2nd occurrence, Claim 19, after "for", "force" should be --forces--.